July 10, 1951  P. D. ASTRY  2,560,064
ADJUSTABLE LOADING DOCK
Filed June 17, 1946  2 Sheets-Sheet 1

INVENTOR.
PERRY D. ASTRY
BY
Hyde, Meyer, Baldwin & Doran
ATTORNEYS

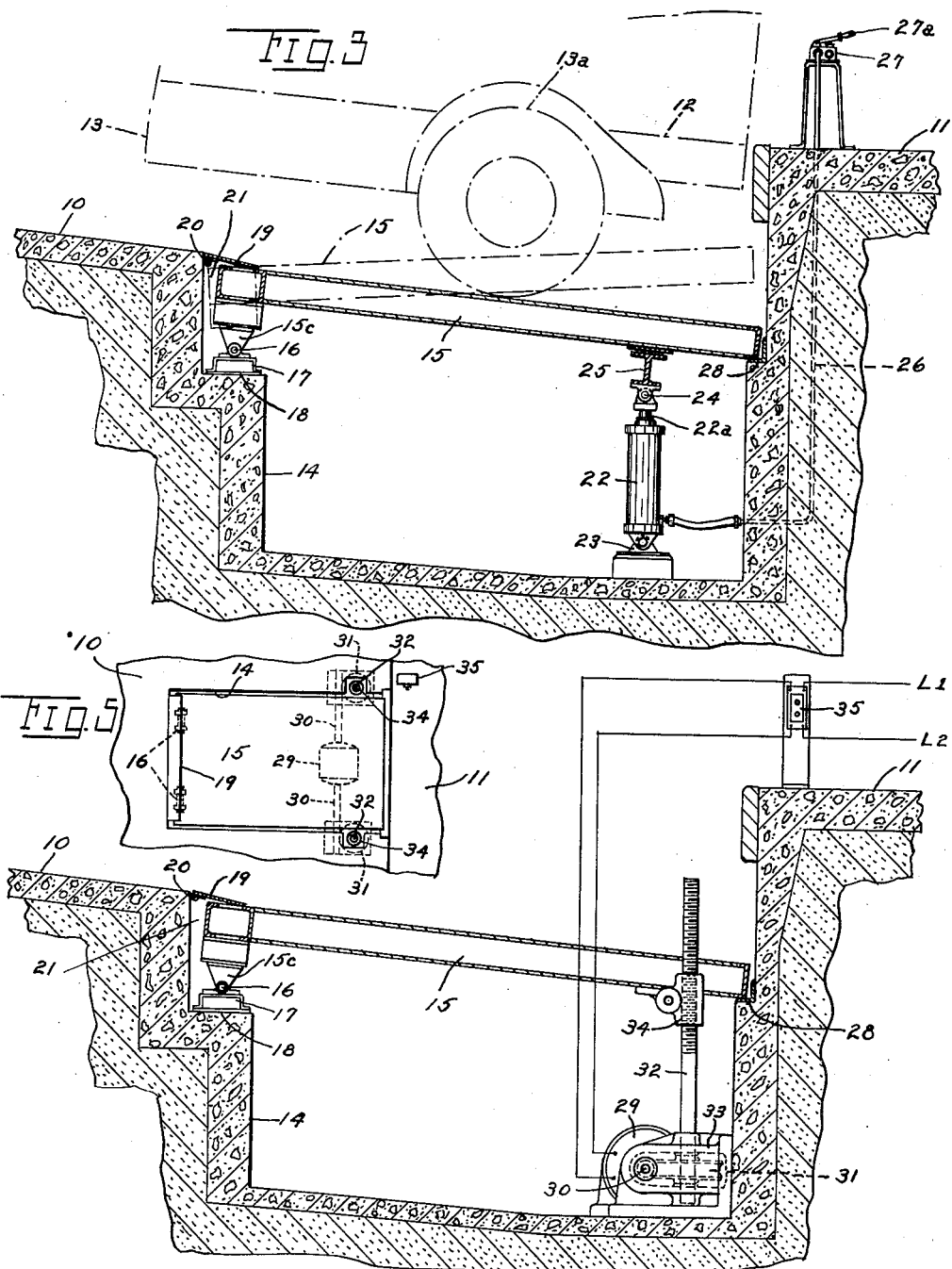

Patented July 10, 1951

2,560,064

UNITED STATES PATENT OFFICE 2,560,064

ADJUSTABLE LOADING DOCK

Perry D. Astry, Shaker Heights, Ohio

Application June 17, 1946, Serial No. 677,309

2 Claims. (Cl. 214—38)

This invention relates to an adjustable unloading dock and provides improved means for accommodating trucks of varying heights at an unloading dock.

It is a well-known fact that the beds of trucks are at varying heights above the roadway, and, therefore, an unloading dock built at the same horizontal level as one type of truck will be too high or too low for other trucks, increasing the difficulty of unloading, which operation is naturally easiest when the truck floor and the dock are at the same level. An object of the present invention, therefore, is to provide a dock at a fixed level and an adjustable platform smoothly connected with the usual roadway upon which the trucks travel. In this combination, power means is provided for adjusting the level of the platform so that trucks whose floors differ widely in their spacing above the roadway may all be placed level with the unloading dock by a simple manipulation of the power device.

It is also well known that trucks equipped with pneumatic tires and spring suspension will vary as to the level of the truck floor above the roadway in the fully loaded and partially unloaded conditions of the truck. Another object of the present invention, therefore, is to provide power means for changing the level of the truck floor relative to the unloading dock by control means readily accessible on the unloading dock so that adjustments of truck level may be made as often as necessary during the operation of unloading a truck.

Other objects and advantages of the present invention and the novel means provided for carrying out the same will be apparent from the accompanying drawings and description, and the essential features thereof will be set forth in the appended claims.

In the drawings,

Fig. 3 is a sectional view slightly enlarged taken along the line 3—3 of Fig. 1 and showing a truck body in dot-dash position and the extent of movement of the platform when raised in a dot-dash position;

Fig. 4 is a view similar to Fig. 3 showing a modified form of my invention; while Fig. 5 is a small diagrammatic view showing the modification of Fig. 4 in plan.

Figure 1:
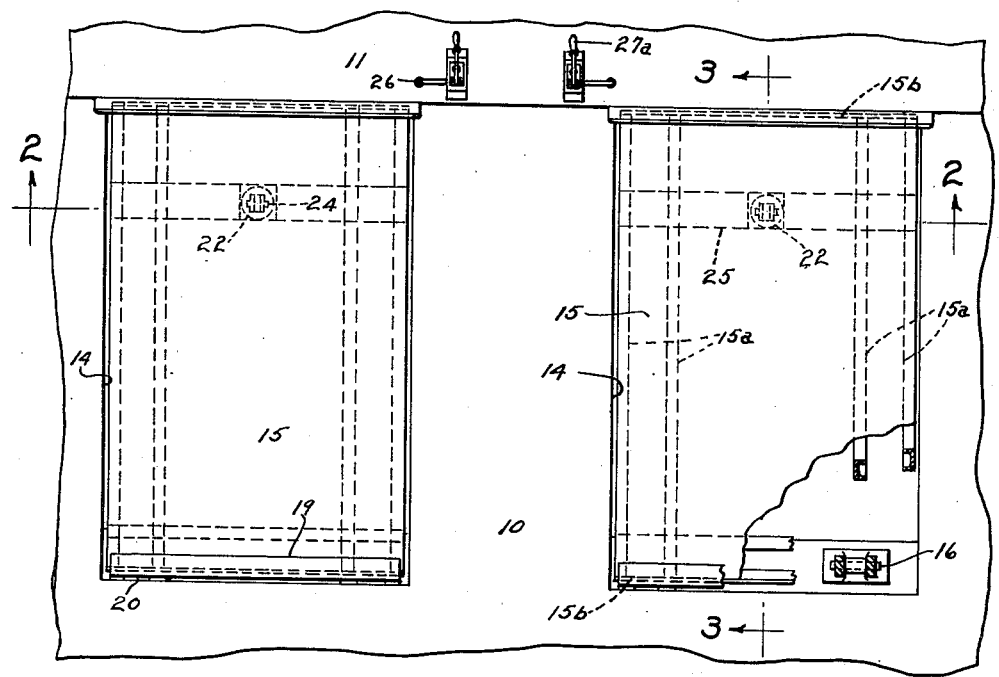
Fig. 1 is a plan view of a dock equipped with two adjustable platforms embodying my invention.
Figure 2:
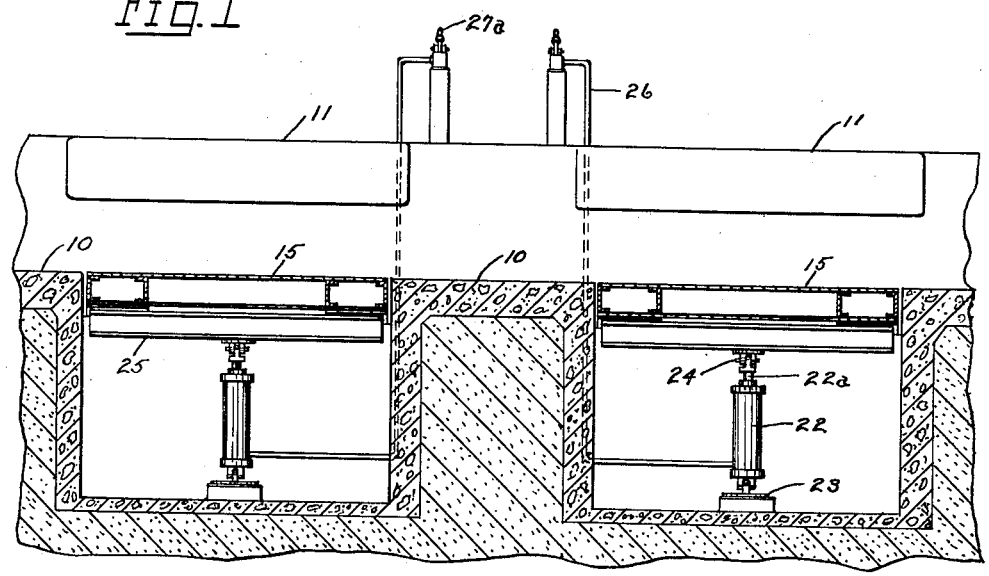
Fig. 2 is a sectional view of the same taken along the line 2—2 of Fig. 1.

Referring now to Figs. 1 to 3, a roadway is indicated at 10 and a raised unloading dock at 11. This dock is preferably fixed relative to the roadway 10 and is at an average height above the roadway, that is to say, the bed 12 of a truck 13 of average height above the roadway will be approximately level with the top of the dock 11. It is thus possible with a minimum of movement of my improved adjustable platform to adjust the floor 12 of any truck on the same horizontal level as the top of the dock 11 with a minimum adjustment of my novel platform. Any number of adjustable platforms may be provided as will be readily understood. I will, therefore, describe one as being representative of any desired number.

Adjacent the dock 11, I preferably provide a pit 14 for the purpose of housing the power-operating mechanism for raising and lowering the adjustable platform 15 which forms a top cover for the pit. It is obvious that the power means could be placed otherwise, but in the position shown it is out of the way and protected from the elements. At the end of the pit 14 remote from the dock 11, pivot means 16 is provided for the platform 15. This pivot means preferably extends parallel to the edge of the dock 11 for obvious reasons. As here shown, the platform 15 is very strongly constructed of a plurality of parallel beams 15a of channel section or other suitable structural forms. These are cross connected at the ends by cross-channels 15b. Brackets 15c at the outer end of the platform and brackets 17, mounted on a shoulder 18 of the pit, support coacting hinge pin structure through which the pivot pins 16 pass to make a hinge connection between the outer end of platform 15 and the base support resting below ground level. Preferably a flat member 19 is pivoted on a fixed pivot 20 in position to overlie the slight opening at 21 so that this opening is covered during all movements of platform 15.

Power means is provided for causing oscillation of platform 15 about the hinge 16. In Figs. 1 to 3, this power means comprises a hydraulic ram 22 which comprises a cylinder having a trunnion mounting on a bracket 23 in the base of the pit. The piston rod 22a of the ram is pivotally connected at 24 with a cross-beam 25 which in turn is secured to the beams 15a. It will be understood that beams extending diagonally of the platform 15 may be provided if necessary to prevent twisting of the platform under the loads encountered.

A standard supply of hydraulic fluid under pressure is illustrated by means of the conduit 26 which connects with the hydraulic ram and is supplied from a source of pressure not shown. In the conduit 26 is a control valve 27 of a known type which when operated in one direction permits the flow of pressure fluid to the ram, and which when operated in the opposite direction permits the flow of fluid away from the ram. The operating handle 27a of this valve is located on the dock 11 at a point immediately adjacent the space where material is unloaded from truck 13 onto the dock 11. It is thus very easy for an operator unloading the truck or supervising the unloading to manipulate the valve 27 so as to adjust the height of platform 15 to set the truck floor 12 at exactly the same level as the dock 11 and to make adjustments from time to time as the unloading of the truck causes a variation in the level of the truck floor due to unloading of the springs, tires, etc.

It will be noted from an inspection of Fig. 3 that a wide variety of trucks may be readily accommodated by the use of my improved invention. Trucks having a high floor level above the roadway would utilize the platform 15 in the full-line position shown, whereas trucks having a low floor level above the roadway would call for the movement of the platform 15 to the dot-dash position or some point between the two positions indicated.

For safety reasons, a shoulder 28 may be provided on the wall of the pit nearest the dock for supporting that end of platform 15 in its lowermost position if desired.

It is obvious that other power means might be applied to control the position of platform 15. For instance, in Figs. 4 and 5, I have shown a roadway 10, dock 11, and pit 14 as before together with platform 15 closing the open top of the pit and hinged at 16 for oscillation movement as before. In the pit, I have mounted an electrical motor 29 which drives the horizontal shaft 30. At each end of shaft 30 is a worm and wheel drive 31 for driving the vertically extending screws 32 which are keyed to the wheel portion of the unit 31. Each screw has bearings in the housing 33 to hold the screw against vertical movement. A nut or threaded sleeve 34, coacting with screw 32, is pivotally mounted on platform 15. Electric power is supplied to motor 29 from any suitable source L1, L2 and controlled by switch 35 which is located on dock 11 in a position analogous to the location of the control handle 27a previously described so that it is readily accessible to an operator unloading a truck.

The operation of this modified form of my device should now be apparent. A truck coming in for unloading passes smoothly from the roadway 10 onto the platform 15 after which the operator actuates the switch 35 for controlling the motor 29 which is of a usual reversible type. One of the buttons of the switch causes the motor to run in a direction to elevate platform 15, and the other button of the switch runs the motor in the reverse direction to lower the platform 15. When the motor 29 is operated, the screws 32 are rotated in unison and carry the threaded sleeves 34 up or down thus resulting in the adjusting of the platform 15 as desired.

I have shown the roadway 10 as sloping downwardly toward the dock 11, but this is merely to show standard practice at unloading docks and is in no sense a limitation on my invention. Obviously, the roadway 10 may be level if desired. The important thing is that my platform 15 is an extension of the usual roadway and sufficiently wide to accommodate both of the rear wheels 13a of a truck coming in for unloading. These rear truck wheels travel smoothly from the roadway 10 onto the platform 15 after which oscillation of the platform 15, as described, carries the rear end of the truck up or down until the rear end of the truck floor 12 is absolutely on a level with the dock surface 11. Much time is saved in unloading trucks by the use of my device as it is not necessary to place ramps or plates to bridge the difference in level which usually exists between the truck floor 12 and the top of the dock 11.

What I claim is:

1. In the combination of a roadway for road vehicles and a dock a fixed distance above said roadway, a platform adjacent said dock having an end away from said dock at substantially roadway level, means mounting said platform for oscillation up and down about said end as a general center of oscillation, coacting screw and nut members, one of said members secured to said platform, the other of said members secured against vertical movement, power means for rotating said other member, and control means for said power means located on said dock and close to that portion of said dock above said platform.

2. In the combination of a roadway for road vehicles and a dock a fixed distance above said roadway, said dock having an edge to which road vehicles move for unloading, an open top pit extending beneath said roadway level and adjacent said dock, a platform substantially closing the open top of said pit, the end of said platform farther from said dock being substantially at roadway level, hinge means supporting said end of said platform, said hinge means providing a pivotal axis for said platform generally parallel to the edge of said dock, power means in said pit operatively connected with said platform for raising and lowering the end of said platform nearer said dock, and control means for said power means located on said dock and close to that portion of said dock above said platform, whereby a person on said dock unloading a truck resting upon said platform would be closely adjacent said control means.

PERRY D. ASTRY.

REFERENCES CITED

The following references are of record in the file of this patent:

UNITED STATES PATENTS

| Number | Name | Date |
|---|---|---|
| 431,678 | Thoms | July 8, 1890 |
| 1,112,543 | Love | Oct. 6, 1914 |
| 1,299,516 | Spencer | Apr. 8, 1919 |
| 1,835,133 | Bergen, Jr. | Dec. 8, 1931 |
| 1,890,796 | Stearns | Dec. 13, 1932 |
| 1,968,624 | Trapp | July 31, 1934 |
| 2,186,463 | Maine | Jan. 9, 1940 |
| 2,409,870 | Kinnaird | Oct. 22, 1946 |

FOREIGN PATENTS

| Number | Country | Date |
|---|---|---|
| 31,019 | Denmark | Dec. 15, 1922 |